Figure 1:
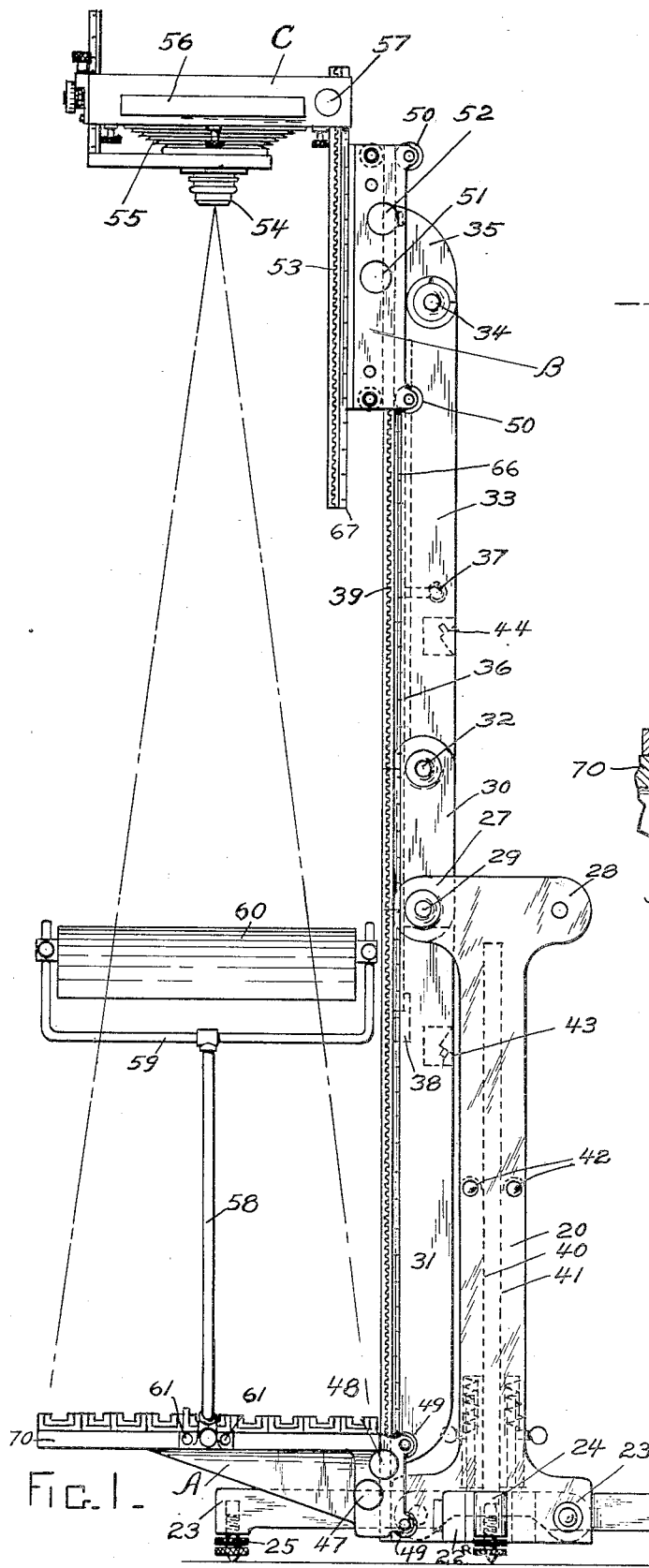

July 20, 1943.   H. C. HUEBNER   2,324,842
COMPOSITOR CAMERA
Filed Nov. 21, 1941   7 Sheets-Sheet 1

INVENTOR
William C. Huebner
By Joseph Harris
ATTORNEY

July 20, 1943.    H. C. HUEBNER    2,324,842
COMPOSITOR CAMERA
Filed Nov. 21, 1941    7 Sheets-Sheet 3

INVENTOR
William C. Huebner
By Joseph Harris
ATTORNEY

July 20, 1943.  H. C. HUEBNER  2,324,842
COMPOSITOR CAMERA
Filed Nov. 21, 1941  7 Sheets-Sheet 5

INVENTOR
William C. Huebner
By Joseph Harris
ATTORNEY

July 20, 1943. H. C. HUEBNER 2,324,842
COMPOSITOR CAMERA
Filed Nov. 21, 1941 7 Sheets-Sheet 6
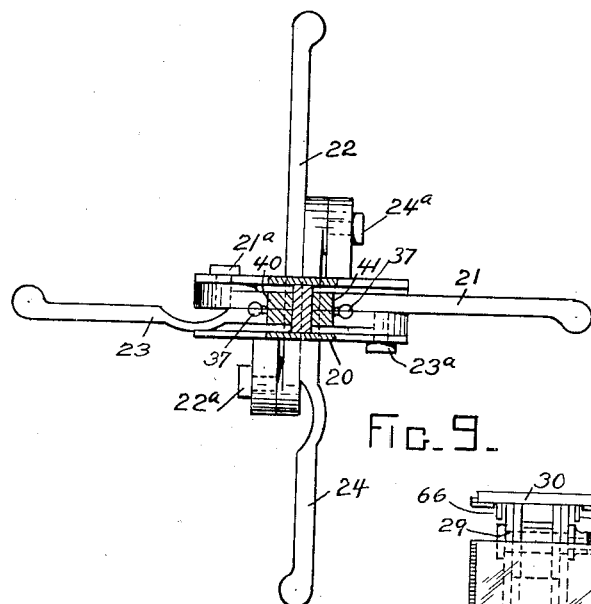
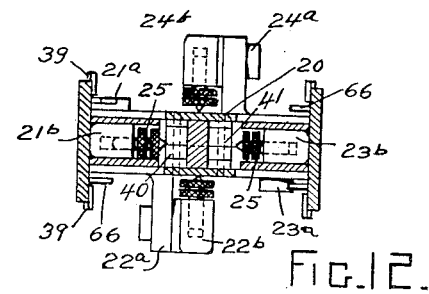
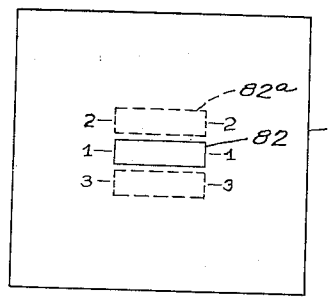
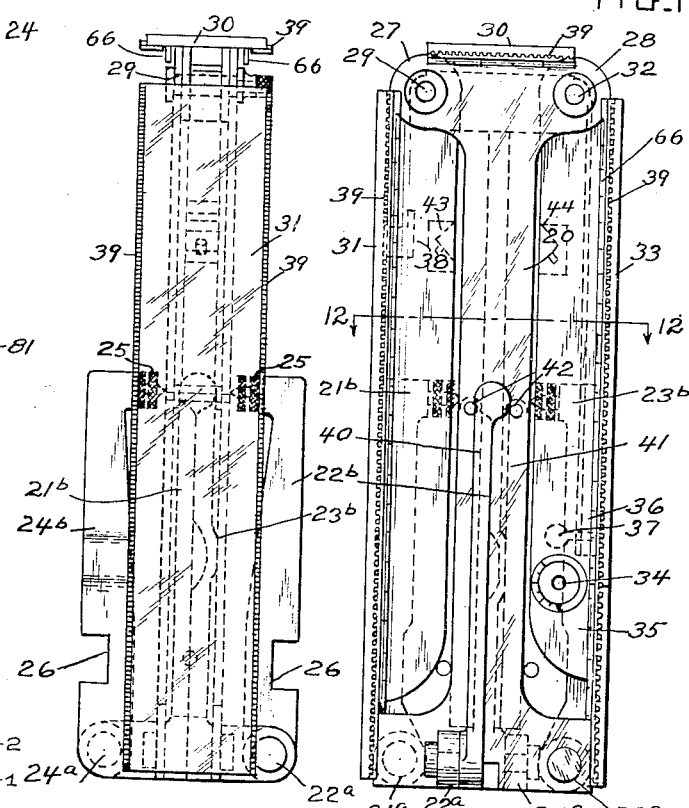
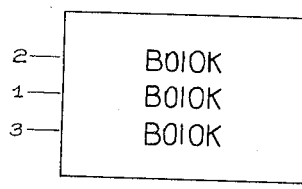
INVENTOR
William C. Huebner
By Joseph Harris
ATTORNEY July 20, 1943.  H. C. HUEBNER  2,324,842
COMPOSITOR CAMERA
Filed Nov. 21, 1941  7 Sheets-Sheet 7
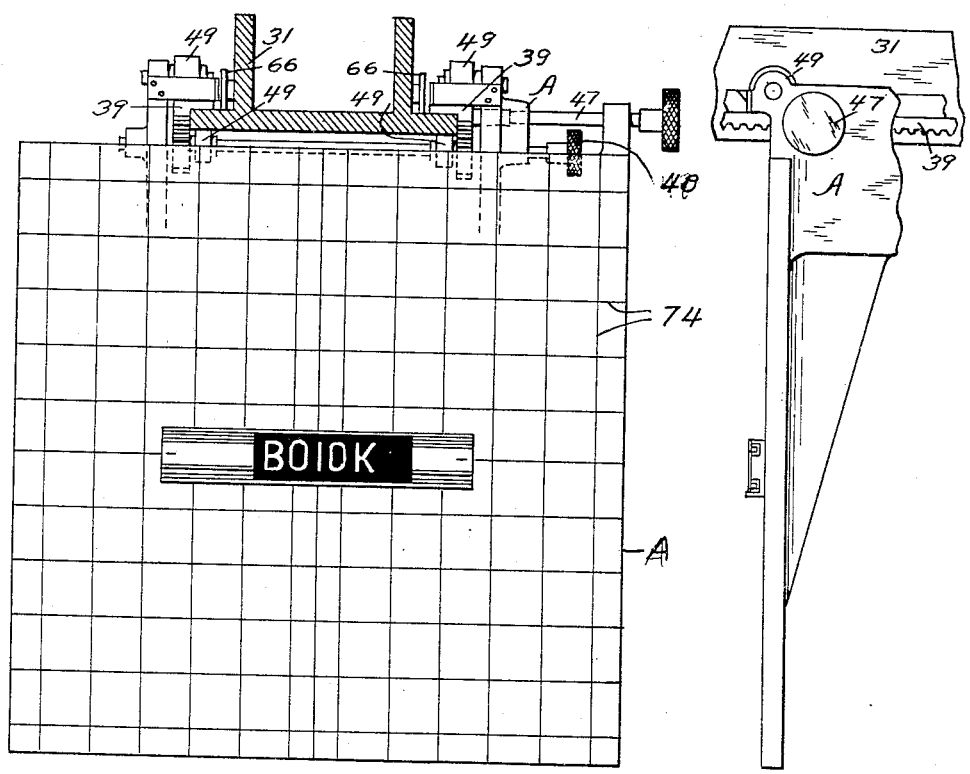
Fig_14_
Fig_16_
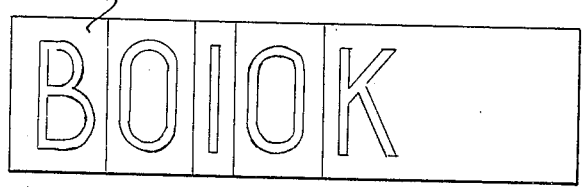
Fig_19_
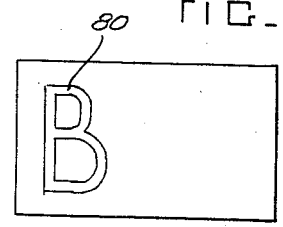
Fig_15_
Fig_17_
Fig_18_
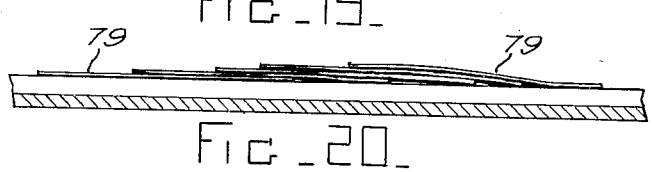
Fig_20_
INVENTOR
William C. Huebner
By Joseph Harris
ATTORNEY Patented July 20, 1943

2,324,842

UNITED STATES PATENT OFFICE 2,324,842

COMPOSITOR CAMERA

William C. Huebner, New York, N. Y.

Application November 21, 1941, Serial No. 419,840

7 Claims. (Cl. 88—24)

This invention relates to improvements in compositor camera.

One important object of this invention is to provide a camera by which words, names, numbers, and the like may be photographically produced, particularly for cartographic or map making purposes as, for instance, for army field work. More especially, the invention contemplates a camera such that any desired grouping of letters, numbers, or other identifying data, may be assembled on the copy board of the camera, the copy thus assembled then exposed, preferably on sensitized photographic paper, either by the use of reflected or transmitted light so that the developed exposure will read head up and from left to right as required for placing the words, names, numbers, or other data on the maps to identify and locate the positions of towns, roads, farms, streams, and other geographical information.

Specifically, an object of the invention is to provide a camera of the type set forth in the preceding paragraph by which the desired words, names, numbers, or other identifying data may be produced on the photographic material in greatly reduced sizes.

Another important object of the invention is to provide a camera of such operating flexibility that it may readily be converted or used set up either as a horizontal camera, or as a vertical camera, or as a right angle camera, in the last instance by use of a reflecting surface in front of the lens to produce reversed images, that is, those reading head up but from right to left.

Still another object of the invention is to provide a camera by which not only greatly reduced images may be produced but also enlargements without the necessity of any separate enlarging apparatus.

A further important object of the invention is to provide a camera of the character indicated in the preceding paragraphs which is especially adapted for use in the field, particularly in connection with map making, and of such lightness and construction that it may be readily knocked down or folded up into a compact unit for insertion in a box and easily carried by a single person.

Another specific object of the invention is to provide an improved copy holder of a magnetic type for holding the individual letters or numbers used in composing the different names, words, etc., the names or words being composed in any desired spacing by hand upon a "stick" in a manner similar to type setting upon a stick and which stick is provided with permanent magnets and whereby the sticks can be placed above or below the center line of the lens axis and the resulting projecting image produced correspondingly on the sensitized element and thus, by employing suitable masking means, permitting the entire area of the sensitized surface to be utilized and reducing to a minimum the time required for developing and finishing the sensitized element.

Other objects of the invention will more clearly appear from the description and claims hereinafter following taken in connection with the drawings.

Figure 8:
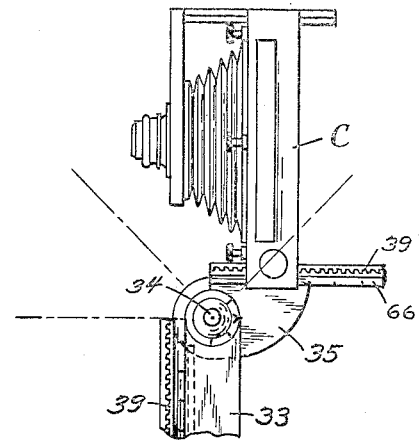
Figure 7:
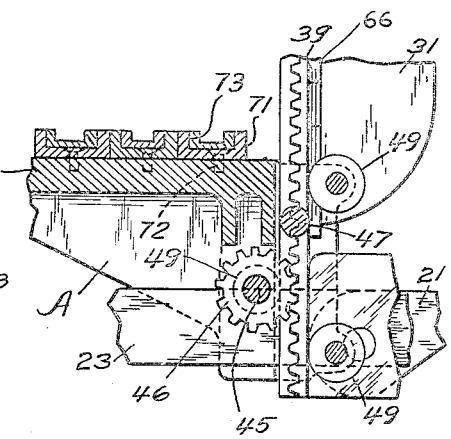
Figure 13:
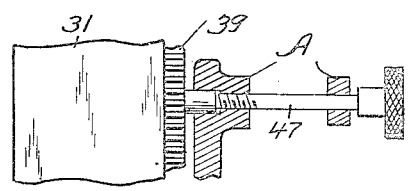
Figure 2:
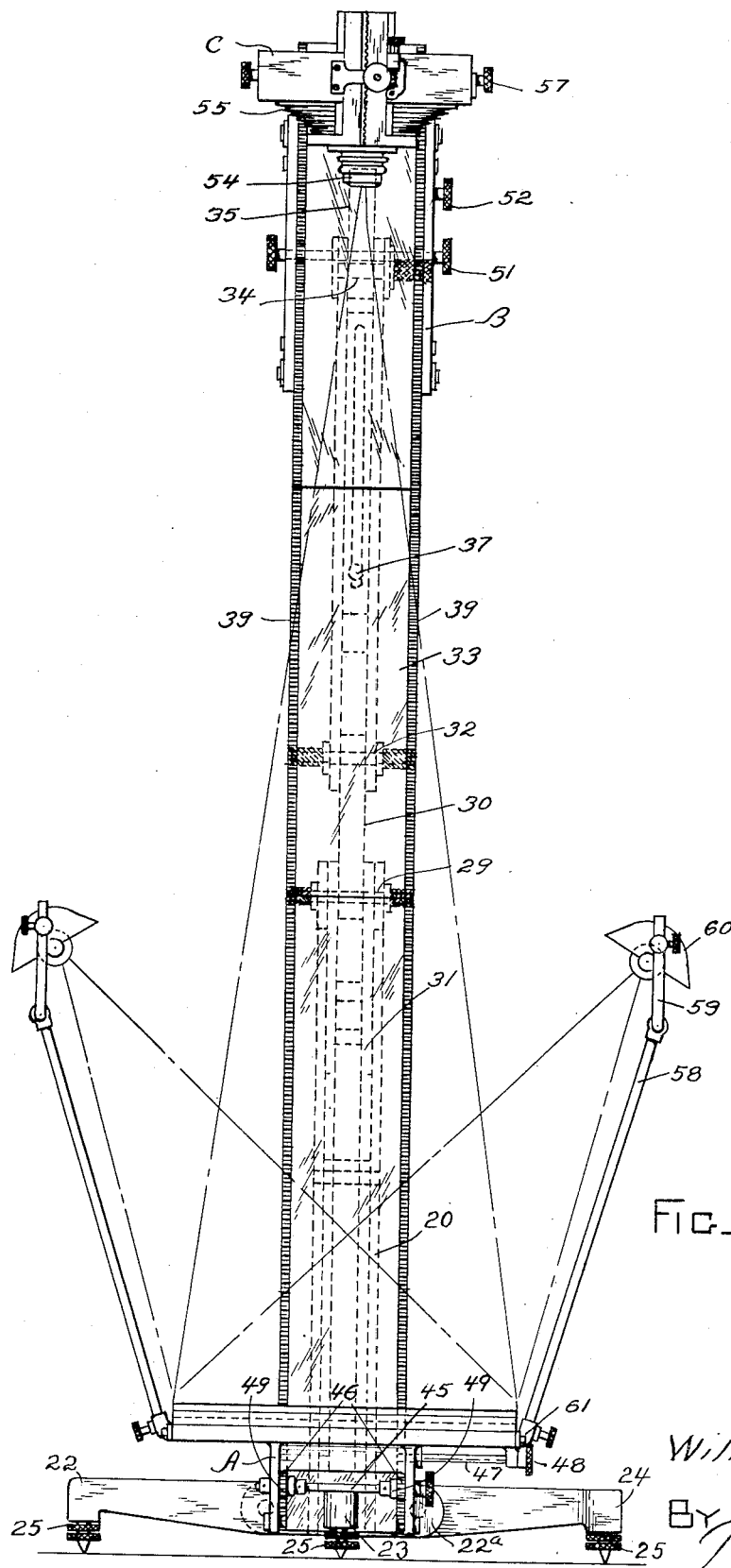
Figure 3:
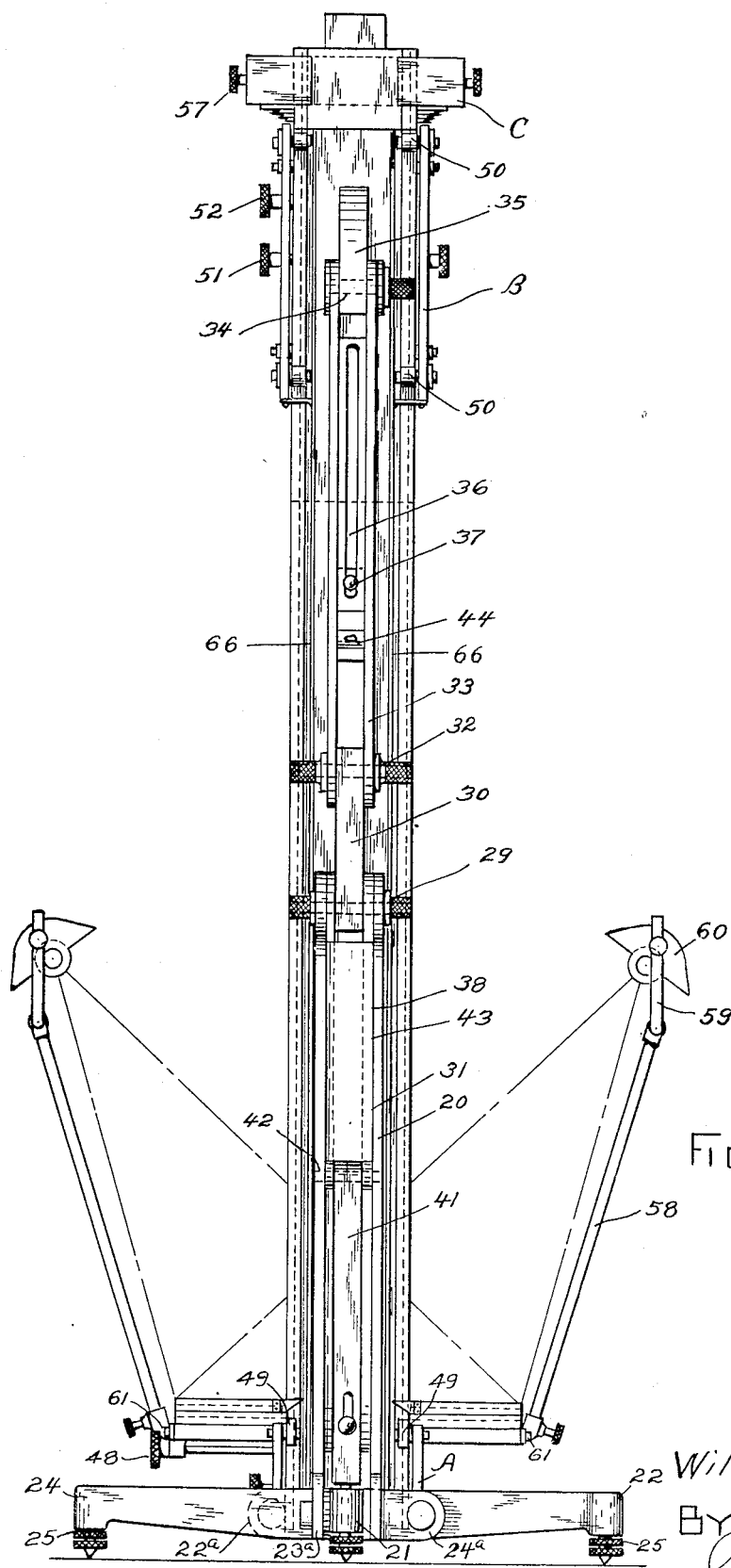
Figure 4:
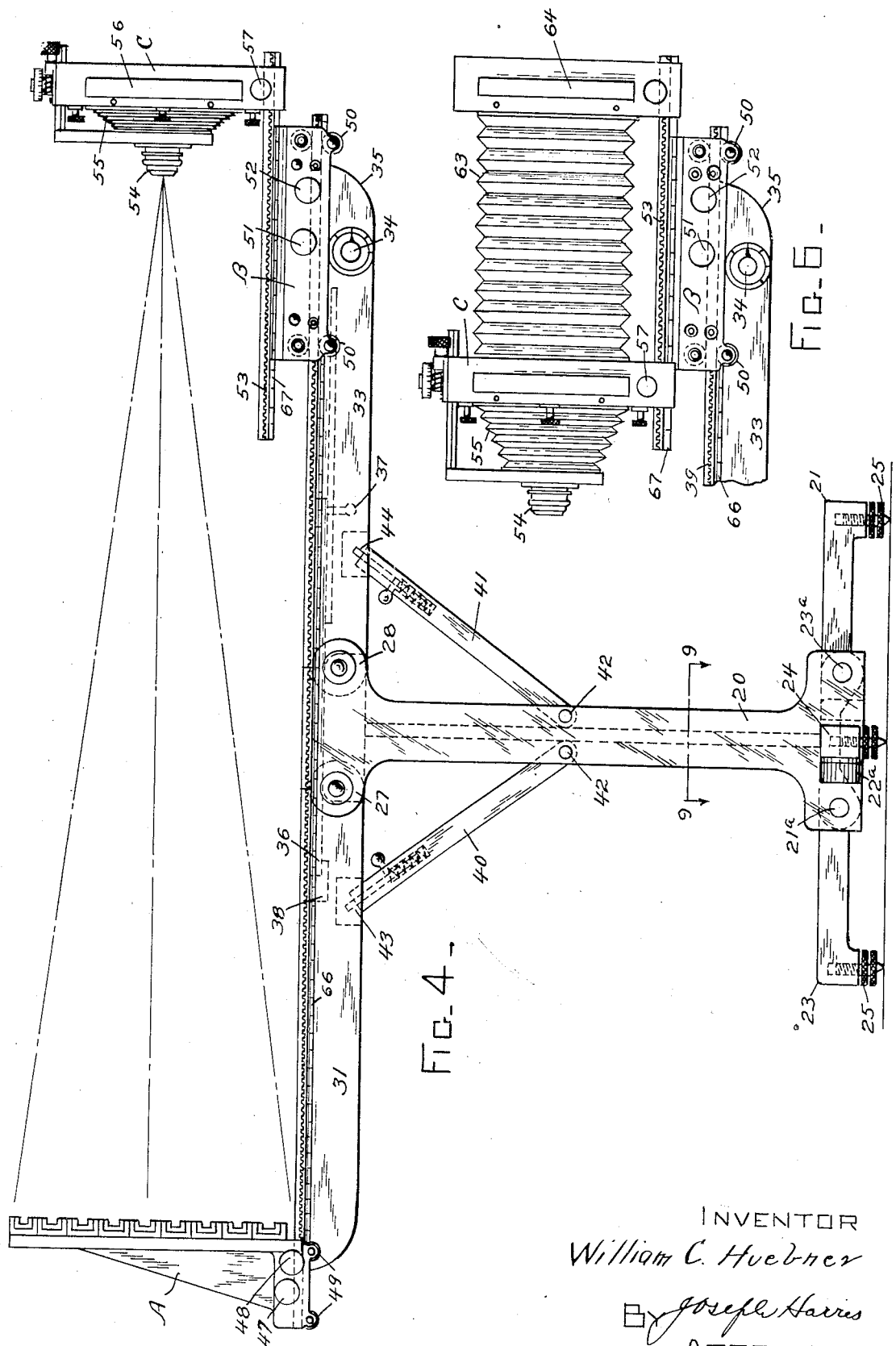
Figure 5:
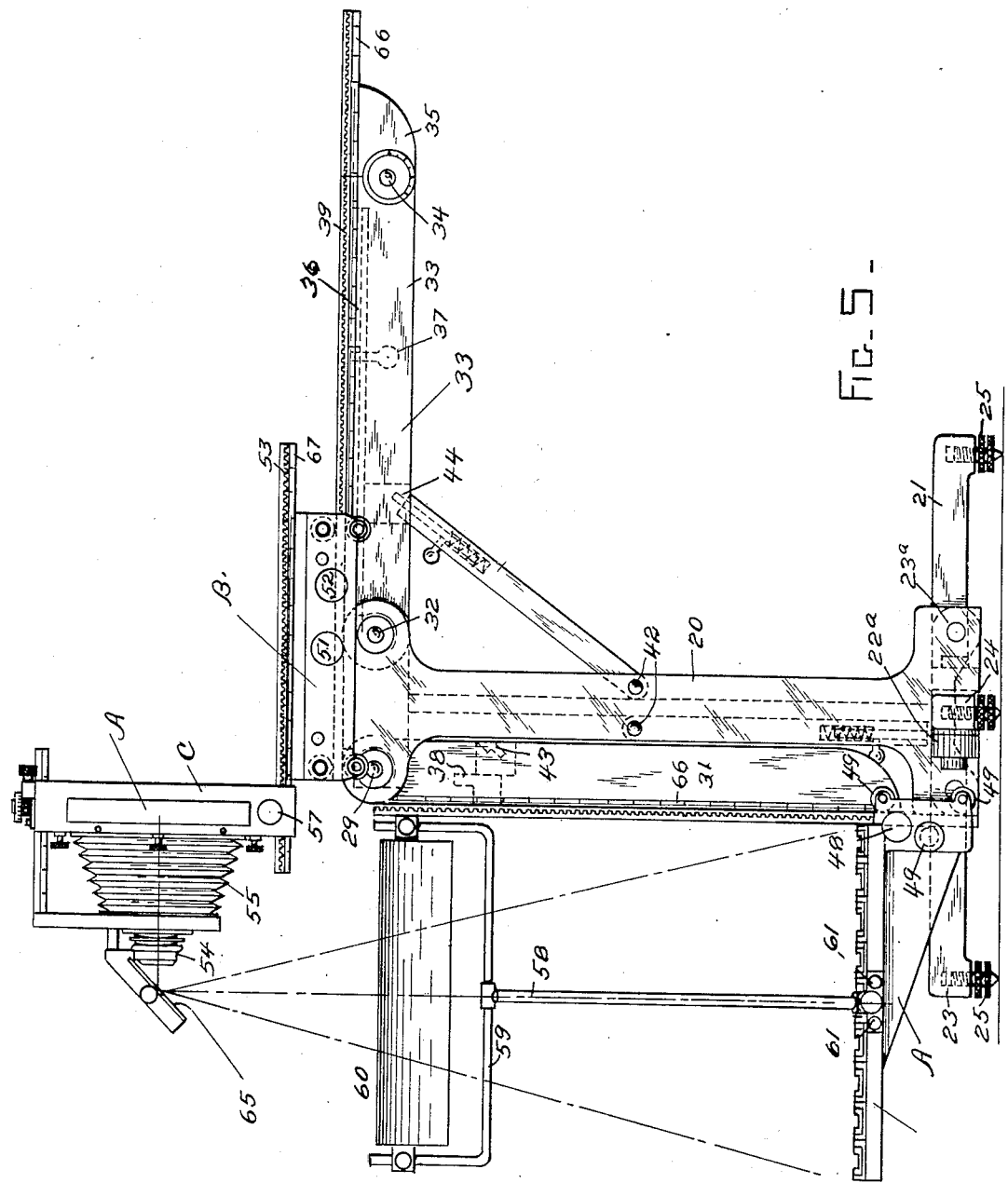

In the drawings forming a part of this specification, Fig. 1 is a side elevational view of a camera embodying the improvements, the camera being set up in a vertical position for making extreme reductions. Fig. 2 is a front elevational view of the camera shown in Fig. 1, that is, looking at Fig. 1 from the left as shown in Fig. 1. Fig. 3 is a similar elevational view by looking at the camera from the right hand side, as viewed in Fig. 1. Fig. 4 is an elevational view of the camera showing the same set up as a horizontal camera. Fig. 5 is a side elevational view showing the camera set up as a right angle camera. Fig. 6 is a broken elevational view similar to part of Fig. 4 illustrating the camera adapted for enlargement purposes. Fig. 7 is a detailed vertical sectional view illustrating more particularly the means for adjusting the copy holding carriage. Fig. 8 is a broken, detailed view showing portions of the camera as the same is adapted for emergency purposes in photographing objects not carried by the copy holding carriage of the camera. Fig. 9 is a horizontal sectional view, corresponding to the section line 9—9 of Fig. 4. Figs. 10 and 11 are side and front elevational views, respectively, showing the camera in its folded or collapsed form. Fig. 12 is a horizontal sectional view corresponding substantially to the line 12—12 of Fig. 10. Fig. 13 is a detail sectional view of the latching or locking pin for the carriage. Fig. 14 is a top plan view of the copy holder carriage with the standard and tracks shown in horizontal section. Fig. 15 is a broken side elevational view of the structure shown in Fig. 14. In Fig. 16 is an end elevational view of a magnetic holding stick. Figs. 17 and 18 are plan and edge elevational views respectively of one of the characters employed in the copy. Fig. 19 is an enlarged plan view of the arrangement of several characters to make up a word for photographing. Fig. 20 is an enlarged sectional view corresponding to the line 20—20 of Fig. 16. Fig. 21 is a plan view of an improved mask adapted to be employed with the improved camera, and Fig. 22 is a plan view of a print or negative with three exposures indicated thereon of the same word as made with the use of the mask shown in Fig. 21.

In said drawings the improved camera is shown as comprising a standard 20 which, in all operating positions of the camera extends vertically. Said standard is of approximately H cross section as best indicated in Figs. 1 and 9 so as to thereby provide channels on either side thereof for the reception of certain other parts of the camera, as hereinafter described. At its lower end, the standard has pivotally connected thereto four legs 21, 22, 23, and 24, which, when in operative position to support the standard 20 are extended horizontally at ninety degrees to each other as best shown in Fig. 9. Each of said legs is provided on the under side thereof, when in horizontal operative position, with suitable leveling screws 25—25. The leg 21 is pivoted to outstanding flanges at the bottom of the support 20 at the point indicated at 21ª. Similarly, the legs 22, 23, and 24 are pivotally connected to the standard as indicated at 22ª, 23ª, and 24ª, respectively. When the standard is folded for transportation purposes, the leg 21 is swung downwardly about the pivot 21ª through an arc of two hundred and seventy degrees until it occupies a vertical position as shown by dotted lines at 21ᵇ in Fig. 10. Similarly the leg 23 is swung in the opposite direction so as to occupy the position as indicated at 23ᵇ in Fig. 10. Leg 22 assumes a vertical position as shown at 22ᵇ in Fig. 10 and the leg 24 the position 24ᵇ shown in dotted lines in Fig. 11 and also in Fig. 12. Two of the legs, 22 and 24, are suitably notched as indicated at 26 to accommodate the two other legs 21 and 23 when the legs are in the extended horizontal position.

The upper end of the support 20 is formed with laterally extended spaced ears 27 and 28 and provides the main means of supporting the main track of the camera. Pivotally connected to the ears 27 as indicated at 29 is a short track section 30 of such dimensions that, when disposed horizontally as shown in Figs. 4, 5, and 10, it is substantially co-extensive with the laterally enlarged upper end of the standard 20. Also pivotally connected to the standard at 29 is a longer track section 31 shown in a dependent position in Fig. 1. Pivotally connected to the central track section 30 as indicated at 32, is another relatively elongated track section 33 which, as shown in Fig. 1, is extended vertically upward. The track section 33, in turn, has pivotally connected thereto as indicated at 34, a short end section 35. Slidably mounted and guided on the track section 33, is a slide or locking bar 36 adapted to be manipulated by a hand piece 37, said locking bar 36 when pushed down to its extreme bottom position as shown in Fig. 1, engaging a notched block 38 carried by the track section 31, as shown, the locking bar 36 thereby rigidfying the track section and serving additionally to maintain all the parts of the track in proper alignment. All of the track sections are provided with racks 39—39 along each side thereof which rack sections, when the track sections are in alignment and with their adjacent ends abutting as shown, provide continuous racks from one end of the track to the other, as will be obvious.

When the sectional main track is disposed horizontally, as shown in Fig. 4, it is additionally supported by two brace bars 40 and 41 pivoted as indicated at 42—42 to the standard 20, said brace bars having spring controlled latches at their free ends adapted to engage in suitable notches 43 and 44 in the track sections 31 and 33, respectively. When the camera is collapsed or folded up, the brace bars 41 are disconnected from the track sections 31 and 33 and swing downwardly and are housed within the opposite channel spaces provided by the support 20, as best indicated in Figs. 1 and 10.

The improved magnetic type copy holder carriage, hereinafter described in detail, is designated broadly by the reference character A and is slidably mounted on the main track, as shown, it being understood that said carriage A may, of course, be entirely removed therefrom. Said carriage A is adjustable with respect to the main track by means of a transversely extending shaft 45 journalled in the main casting of the carriage A, said shaft 45 being provided with pinions 46 engageable with the rack 39 so that said carriage A may be adjusted lengthwise of the track, whether the latter is in vertical position as shown in Fig. 1 or in horizontal position as shown in Fig. 4. The carriage A is adapted to be locked in any adjusted position by any suitable means such as the retractable latching pin 47 so positioned as to engage with the teeth of the rack 39. For convenience of manipulation, the shaft 45 is provided at one end thereof with a knurled hand wheel 48. To guide, steady, and maintain the carriage A with respect to the main track, the carriage is provided with suitable sets of anti-friction rollers 49—49 engaging the under side of the track, as shown.

Also similarly mounted on the main track is the lens carriage designated generally by the reference character B. The latter, also removable from the track when desired, is provided with suitable guiding antifriction rollers 50—50 arranged in pairs on opposite sides of the track, and a pinion arrangement indicated at 51 for adjusting said carriage B and latch or lock 52, similar to those for the carriage A. The carriage B is, in turn, provided with a rack 53 lengthwise of which is adjustably mounted the subcarriage C which supports the lens indicated conventionally at 54, bellows 55, and plate or other sensitized element holder 56. Said subcarriage C is adjusted by means of a suitable pinion cooperating with the rack 53 as by means of a shaft having a hand wheel 57 at the end thereof.

As best shown in Figs. 2 and 3, the copy holding carriage H is adapted to support suitable duplicate illuminating means, one at each side thereof, each of said illuminating means comprising, as shown, a substantially vertically extending rod 58 to which is secured at the upper end thereof a U-shaped frame 59 to which is pivotally attached reflector 60 and within which is disposed the illuminating means proper. Each of the rods 58 is carried by a suitable bracket at its lower end adapted to be detachably secured to the carriage H as by screws 61—61. By the illuminating means described, it is evident that ample direct light may be thrown on the copy carried by the carriage when reflected light is to be employed for photographically activating the sensitized element through the lens.

When the camera is to be transported, the carriages A and B are removed therefrom and preferably carried as separate small units. The supporting legs 21, 22, 23, and 24 are collapsed as hereinbefore described, as also the brace bars 40 and 41. The sectional main track is then folded or collapsed with the track section 31 occupying the position shown best in Figs. 1 and 10. The short track section 30 is disposed horizontally within the upper end of the standard 20 as best indicated in Figs. 4, 10, and 11. The remaining track sections 33 and 35 are then swung downwardly on the opposite side of the standard so as to occupy the position best shown in Fig. 10 and from which it will be seen that the camera, with the exception of the removable carriages, is made exceedingly compact and of such light construction that it may be easily transported by a single individual.

When the camera is to be used for extreme reductions, the same is set up as indicated in Fig. 1, as previously described. In those instances where it is more convenient to employ the camera in a horizontal arrangement and with the copy and sensitized element in parallel relation, the camera is set up as indicated best in Fig. 4. Where it is desired to obtain enlargements, a second carriage or auxiliary carriage D is employed as shown in Fig. 6, the same being mounted on the main lens carriage B and adjustable lengthwise thereof in a manner similar to the subcarriage C. In such instances, a second bellows 63 is employed between the subcarriages C and D and the plate or other sensitized element 64, disposed within the auxiliary carriage D, as will be understood.

When it is desired to obtain reversed images on the sensitized element, the camera is set up as a right angle camera as shown in Fig. 5, in which case the sections 30, 33, and 35 of the main track are disposed horizontally as there shown and the other section 31 of the track disposed vertically. The main lens carriage B is brought to the left hand end of the horizontal portion of the track, as shown in Fig. 5, so as to bring the lens above the horizontally disposed copy holding carriage H. To obtain the reverse image, a reflecting mirror 65 is attached in front of the lens by any suitable means as there indicated, thus insuring reversing of the image so that, in lettering or wording, the reproduced image will read head up but from right to left in a manner that will be well understood by those familiar with relief printing.

While the improved camera is intended primarily for photographing copy supported on the carriage A, nevertheless, there may be emergency instances when it is desired to photograph other objects as by an ordinary camera. The present improved camera may be adapted for this purpose as best indicated in Fig. 8 wherein the short end track section 35 is positioned horizontally while supported by the vertically positioned track section 33 and the lens subcarriage C mounted on the section of rack carried by the track section 35 so that, as will be apparent, any object in front of the lens may be photographed on the plate or other sensitized element.

Referring now more particularly to the magnetic type of copy holder in connection with carriage A and as shown best in Figures 1 and 7. As there shown, the carriage A is formed with a horizontally extending supporting surface 70 of such metal that it may be permanently magnetized. Mounted on the supporting surface 70 is a plurality of U-shaped magnetic bars 71 which, as shown in said figures, are placed side by side in close relation so as to cover the entire area of the supporting surface 70. Said bars 71, in addition to being held to the supporting surface 70 magnetically, may be positively accurately aligned by means of dowels 72—72 carried by the bars and entering corresponding perforations in the supporting surface 70. Disposed within each of the bars 71 is a U-shaped stick 73 extending lengthwise of the bar 71 and obviously adapted to be retained in place in the bar 71 by the magnetic action. With the arrangement of magnetic copy holding carriage as just described, it is apparent that the copy, either in the form of individual character elements or complete word elements may be placed anywhere within the area of the copy holding surface, it being understood that the letter or word copy elements will be of such type as to be held firmly down in position by magnetic attraction such, for instance, as by placing thin sheets or strips of steel or the like on the under side of the character or word elements.

Referring next to the copy holding carriage arrangement illustrated in Figs. 14 to 20, the carriage A is or may be substantially the same as that described in the preceding paragraphs, with, however, gauge or indicator lines 74 extending horizontally and vertically thereover as viewed in Fig. 14. Adapted to cooperate with the magnetized supporting surface of the holder A, may be employed one or more magnetic holding sticks such as indicated best in Fig. 16. In this form of holding stick, indicated at 75, a permanently magnetized plate of relatively elongated structure is preferably employed, the same being channeled out adjacent each edge thereof to receive therein U or channel-shaped magnetized bars 76—76. Preferably, the stick 75 is provided along one edge thereof with a flange 77 which extends slightly above the top surface of the composite magnetic stick so as to provide an abutment for properly aligning the characters constituting the copy. As will be apparent, the magnetic stick 75 may be placed anywhere on the supporting surface of the carriage A, the single stick shown in Figure 14 being horizontally disposed and centrally located. As will also be obvious, the stick may be placed higher or lower or to either side of the vertical center line and as many sticks employed as may be necessary under any given circumstances.

For certain classes of work, particularly cartographic or map making purposes in Army field work, it is highly desirable to reduce the number of operations to the minimum and speed the results as much as possible. To this end, it is highly desirable to produce the words that are to be placed on the maps for identification purposes in the photographic copy in one step.

For this purpose, there is preferably employed specially constructed copy-forming cards bearing the desired characters which are best shown in Figs. 17 to 20. Each of the character cards is comprised of a lower or under side of thin sheet steel or the like as indicated at 78 to the upper surface of which is cemented preferably photographic paper indicated at 79. The photographic paper is prepared so as to provide a solid background with the letter or other character 80 thereon left white so that, when the exposures are made, the negative or print will develop with the words or characters in black so that they may be cut out and immediately placed on the maps for identification purposes. Also, in order to prevent any white being photographed on the negative, other than the desired letters or characters, the edges of each character card are blackened.

In utilizing the character cards 78—79 where individual letters are employed thereon, the character card with the first letter, such as B, is placed on the magnetic stick to the left and abutted against the gauge flange 77. The second character card is then laid on top of the first with the proper spacing between the character on said second card and the character on the first card, as best shown in Figs. 19 and 20, and so on until the full word is completed as shown in said figures.

As hereinbefore indicated, it is sometimes desirable to photograph merely a single word and at other times two or more words may be desired. In order that this may be accomplished as expeditiously as possible, a special mask is employed indicated at 81 in Fig. 21. The latter may be provided with one or more openings indicated at 82 in full lines and 82a in dotted lines. If a plurality of openings 82 are formed in the mask, it is obvious that such of those as are not desired at the time of a particular exposure may be covered over with tape. In Fig. 22 is shown a print or negative in which three exposures of the same word have been made. In employing the special opaque mask, the sensitive paper is laid under a transparent and clean glass plate which is inserted in the orthodox negative holder such as used in ordinary cameras. As will be apparent, the glass plate functions to keep the sensitized paper flat. The usual shutter is then inserted in the holder and the holder then inserted in the camera in the orthodox manner. Before exposure, the regular shutter is withdrawn and the improved opaque mask or shutter inserted in the slot of the holder whereupon the exposure may be made.

With reference to Figs. 17 and 19, the same have not been shown with the background opaqued in order to avoid too much black areas on the drawing, but it will be understood that the background of the character cards is to be opaqued as hereinbefore described.

As will be apparent, by employing a magnetic copy holder, the same is operative to hold the copy in any of the several possible set-ups of the camera. When the camera is employed as a vertical camera as shown in Fig. 1, for instance, the copy is disposed horizontally, since the supporting surface of the carriage A is at right angles to the track. The same is true of the arrangement shown in Fig. 5, whereas in Fig. 4, where the camera is set up as a horizontal camera, the copy holding surface is disposed vertically. Stated otherwise, the magnetic holding arrangement is operative in any position of the copy holding carriage, thus contributing to the speed with which the camera may be utilized.

Although there has herein been shown and described what is now considered the preferred manner of carrying out the invention, the same is by way of illustration and not by way of limitation since all changes and modifications are contemplated that come within the scope of the claims hereto appended.

What is claimed is:

1. In a camera of the character described, the combination with a vertically disposed standard; a track section connected at one of its ends to the upper end of said standard by a pivot whose axis extends horizontally whereby said section may optionally assume either a vertical or horizontal position; a second track section pivotally connected at one of its ends to said pivotally connected end of the first section; a third track section pivotally connected at one of its ends to the other end of said second named track section, said track sections being optionally all alignable to form a single main track disposed either horizontally or vertically or disposed part at right angles to the remaining sections whereby to provide either a vertical, horizontal, or right angle camera; a copy holder carriage slidable on said track; a lens carriage slidable on said track; and cooperable means on said carriages and track sections for adjusting the carriages lengthwise of the track sections in any arrangement of the latter.

2. A camera of the character described including a vertically disposed standard; a relatively elongated track section pivotally connected at one end to the upper end of the standard to one side thereof; a relatively short track section corresponding in length approximately to the width of the top of the standard, pivotally connected at one end to said pivotally connected end of the first named section; and a third relatively elongated track section pivotally connected at one end to the other end of said short section whereby all of said sections may optionally be positioned all in alignment and disposed either horizontally or vertically or with the first named section depending vertically and the other two sections horizontally or in a collapsed folded condition with the two relatively elongated sections depending on opposite sides of the standard and the short section across the top of the standard.

3. A camera according to claim 2 wherein each of said track sections is provided with a rack extending longitudinally of the section, said racks being also alignable and contiguous when the track sections are aligned.

4. A camera according to claim 2 wherein the standard is provided at the bottom thereof with a plurality of legs pivotally connected to the standard and adjustable from an operative laterally extended position to a collapsed position alongside the standard.

5. A camera of the character described including: a vertically disposed standard of substantially H cross section; four supporting legs pivotally connected to the bottom of said standard and disposed at right angles to each other when in operative supporting position, two of said legs being swingable to positions within the channels of the standard and the other two to positions on the opposite sides of the standard; and a three section track, the sections being pivotally connected to each other and one of them pivotally connected to the top of the standard, said track sections being movable to a collapsed position with two of the sections depending against the sides of the standard and the third intermediate section across the top of the standard.

6. A camera in accordance with claim 5 wherein said track sections are alignable and abuttable in a horizontally extending position with reference to the standard; and supporting braces for the sectional track when in such horizontal position, said braces being pivotally connected to the standard and movable in a collapsed condition within the channels of the standard.

7. In camera apparatus of the character described, the combination with an upright standard; of a camera track section connected at one of its ends to said standard by a pivot, the axis of which extends horizontally whereby said section may optionally assume either a vertical or horizontal position; and a second track section pivotally connected by the same pivot at one of its ends to both said standard and said first named section whereby said second named section may also optionally assume either a vertical or horizontal position, the pivotally connected ends of said sections abutting and aligning when both sections are simultaneously in either a vertical or a horizontal position to thereby provide a continuous vertical or horizontal track extending the length of both sections.

WILLIAM C. HUEBNER.